United States Patent
Boehmer

(10) Patent No.: US 9,638,097 B2
(45) Date of Patent: May 2, 2017

(54) EXHAUST-GAS TURBOCHARGER

(75) Inventor: Manuel Boehmer, Rockenhausen (DE)

(73) Assignee: BorgWarner Inc., Auburn Hills, MI (US)

( * ) Notice: Subject to any disclaimer, the term of this patent is extended or adjusted under 35 U.S.C. 154(b) by 624 days.

(21) Appl. No.: 14/235,507

(22) PCT Filed: Jul. 24, 2012

(86) PCT No.: PCT/US2012/047919
§ 371 (c)(1),
(2), (4) Date: Jan. 28, 2014

(87) PCT Pub. No.: WO2013/019468
PCT Pub. Date: Feb. 7, 2013

(65) Prior Publication Data
US 2014/0193240 A1    Jul. 10, 2014

(30) Foreign Application Priority Data

Aug. 2, 2011 (DE) .................. 10 2011 109 196

(51) Int. Cl.
*F02B 37/16* (2006.01)
*F02B 37/18* (2006.01)

(52) U.S. Cl.
CPC .......... *F02B 37/16* (2013.01); *F02B 37/183* (2013.01); *F02B 37/186* (2013.01); *Y02T 10/144* (2013.01)

(58) Field of Classification Search
CPC ...... F02B 37/188; F02B 37/16; F02B 37/186; Y02T 10/144
See application file for complete search history.

(56) References Cited

U.S. PATENT DOCUMENTS

| | | | | |
|---|---|---|---|---|
| 3,104,520 A | * | 9/1963 | Cazier | F02B 37/183 415/13 |
| 4,530,640 A | * | 7/1985 | MacInnes | F01D 9/026 415/144 |
| 4,655,040 A | | 4/1987 | Parker | |
| 5,673,559 A | | 10/1997 | Benson | |
| 6,035,638 A | * | 3/2000 | Lamsbach | F02B 37/183 415/145 |
| 6,250,079 B1 | * | 6/2001 | Zander | F02B 37/025 60/602 |

(Continued)

FOREIGN PATENT DOCUMENTS

WO    2009095632 A1    8/2009

OTHER PUBLICATIONS

International Search Report PCT/US2013/047919, dated Dec. 6, 2012.

*Primary Examiner* — Igor Kershteyn
(74) *Attorney, Agent, or Firm* — A. Michael Tucker; Stephan A. Pendorf; Patent Central LLC

(57) ABSTRACT

An exhaust-gas turbocharger (1) having a turbine housing (2) which has a turbine inlet (3) and a turbine outlet (4) and which connects a wastegate duct (5) between the turbine housing inlet (3) and the turbine housing outlet (4), which wastegate duct can be opened and closed via a shut-off element (6). The shut-off element is in the form of a piston (6) which is guided in a longitudinally displaceable manner in an interior space (14) of a guide (7), and the wastegate duct (5) opens into the interior space (14) transversely with respect to the longitudinal central line (L) of the guide (7).

6 Claims, 2 Drawing Sheets

(56) References Cited

U.S. PATENT DOCUMENTS

| | | | |
|---|---|---|---|
| 8,499,747 B2 * | 8/2013 | Schmalzl | F02B 37/025 123/559.1 |
| 2008/0245228 A1 | 10/2008 | Lombard et al. | |

* cited by examiner

EXHAUST-GAS TURBOCHARGER

BACKGROUND OF THE INVENTION

Field of the Invention

The invention relates to an exhaust-gas turbocharger.

Description of Related Art

For charge pressure regulation, the generic exhaust-gas turbocharger is provided with a wastegate duct which connects the turbine inlet to the turbine outlet while bypassing the turbine wheel. When the required charge pressure is attained, at least a part of the exhaust-gas flow can be conducted past the turbine or the turbine wheel through said wastegate or bypass duct. To open and close said wastegate duct, a wastegate flap is provided, which is also referred to as a charge pressure regulating flap. Said charge pressure regulating flap is connected via a linkage to an actuator which may for example be in the form of a pneumatic control capsule or electric actuating motor.

The disadvantage of such a charge pressure regulating flap arrangement is the large number of individual parts which must be manufactured and assembled.

It is therefore an object of the present invention to provide an exhaust-gas turbocharger, which is of simpler construction and is easier to assemble.

BRIEF SUMMARY OF THE INVENTION

According to the invention, a piston is provided as a shut-off element for opening and closing the wastegate duct, which piston is guided in a longitudinally displaceable manner in the interior space of a guide. Here, the guide is arranged such that the wastegate duct opens into the interior space transversely with respect to the longitudinal central line of the guide, such that the wastegate duct or the wastegate duct opening can be opened and closed by the piston.

The particular advantages of the exhaust-gas turbocharger according to the invention include firstly the fact that, in comparison with the previous flap solution, a number of components can be dispensed with.

Since there are fewer components, the risk of incorrect assembly is advantageously reduced.

Since the components are also fixedly connected to one another, noise generation between the components, such as is possible under some circumstances for example at the connection of the flap plate and the spindle, cannot occur.

Furthermore, it is possible for the actuator to be connected to the turbocharger in a very compact manner, which is advantageous in the engine bay in which the exhaust-gas turbocharger is used.

Furthermore, by relocating the entire regulating unit (wastegate valve and actuator), it is possible in this way, too, for the position of the actuator to be adapted to the engine bay.

There is also the resulting advantage that the compact installation of the wastegate piston into the turbine housing improves the access for a milling tool through the turbine housing outlet.

BRIEF DESCRIPTION OF THE SEVERAL VIEWS OF THE DRAWINGS

Further details, features and advantages of the invention will emerge from the following description of an exemplary embodiment on the basis of the drawing, in which.

DETAILED DESCRIPTION OF THE INVENTION

Figure 1:
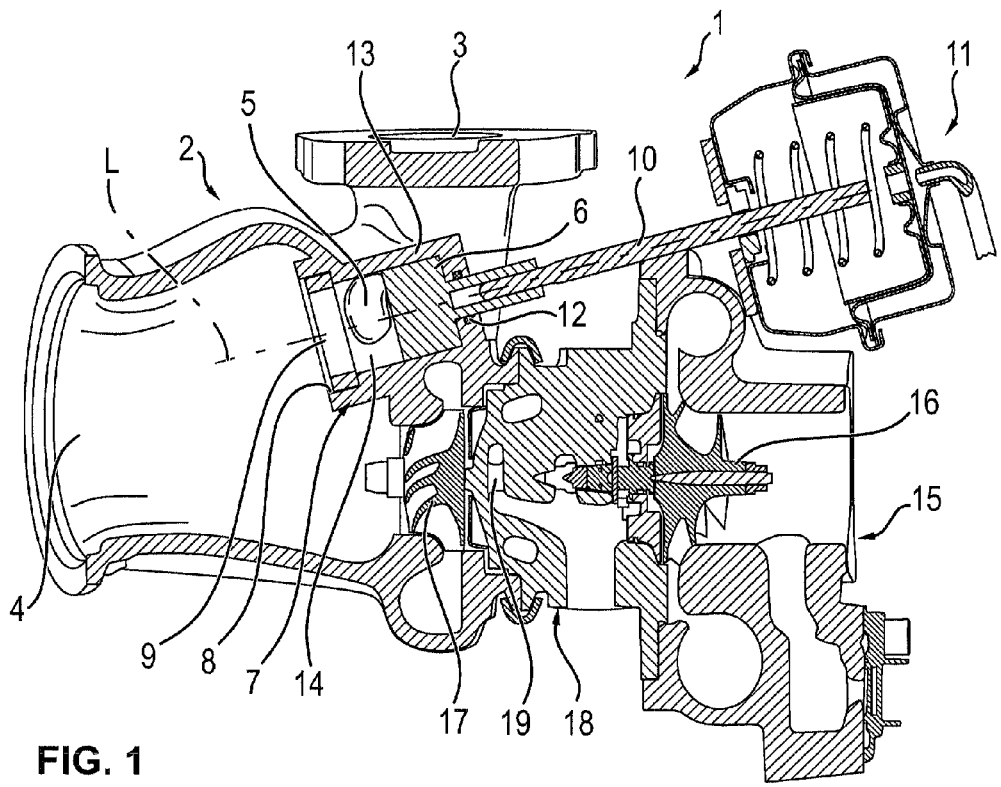
FIG. 1 shows a partially sectional illustration of an exhaust-gas turbocharger 1 according to the invention, with wastegate duct open.

FIG. 1 illustrates an exhaust-gas turbocharger 1 according to the invention, wherein aside from the conventional components such as in particular a compressor housing 15 in which a compressor wheel 16 is arranged and which is connected to a bearing housing 18, said exhaust-gas turbocharger has a turbine housing 2 which is connected to the bearing housing 18 at the other end of the latter and in which a turbine wheel 17 is arranged.

The turbine housing 2 has a turbine inlet 3 and a turbine outlet 4.

Furthermore, FIG. 1 shows a wastegate duct 5 or the opening thereof which connects the turbine inlet 3 to the turbine outlet 4 in the open state shown in FIG. 1, in which open state the exhaust gas introduced into the turbine housing 2 is conducted at least partially past the turbine wheel 17.

To open and close the wastegate duct 5, a shut-off element is provided which, according to the invention, is in the form of a piston 6. The piston 6 is guided in a longitudinally displaceable manner in the interior space 14 of a guide 7. FIG. 1 shows that the wastegate duct 5 opens into the interior space 13 at least approximately transversely with respect to a longitudinal central line L of the guide.

As stated, FIG. 1 shows the open state of the wastegate duct, in which the piston 6 is attracted by an actuator 11, for which purpose the piston 6 is connected to the actuator 11 via a piston rod 10. Said actuator 11 may be formed either as an electric actuating motor or as a pneumatic control capsule. In said attracted state of the piston 6, the wastegate duct which opens into the interior space 14 is open, and the exhaust gas flowing into the turbine housing 2 can pass via the wastegate duct 5 and an outlet opening 8 of the guide 7 into the turbine housing outlet 4, and thus bypass the turbine wheel 17.

As is also shown in FIG. 1, a sealing ring 9 is arranged in the outlet opening 8, which sealing ring may be fixedly connected to the turbine housing 2 or to the guide 7 for example by means of a weld. In the attracted position of the piston 6 shown in FIG. 1, the latter opens up not only the wastegate duct 5 or the wastegate duct opening but also the outlet opening 8, because in said position, as shown in detail in FIG. 1, the piston 6 is raised from the sealing ring 9.

Figure 2:
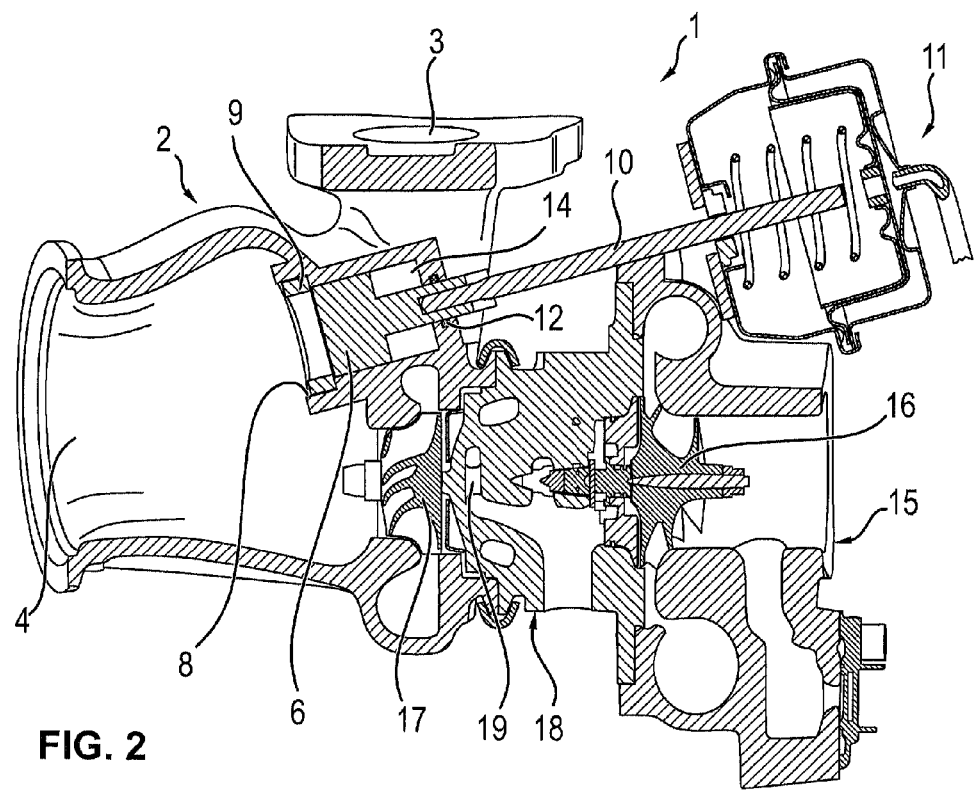
FIG. 2 shows an illustration corresponding to FIG. 1, with wastegate duct closed.

By contrast, FIG. 2 shows the closed position of the piston 6 in which the latter closes off both the wastegate duct 5 and also the outlet opening 8 of the guide 7, because in said position, said piston is pressed against the sealing ring 9 by the actuator 11 and thus blocks the connection between the turbine housing inlet 3 and turbine housing outlet 4. In said position, the exhaust gas introduced into the turbine housing 2 flows entirely via the turbine wheel 17.

Figure 3:
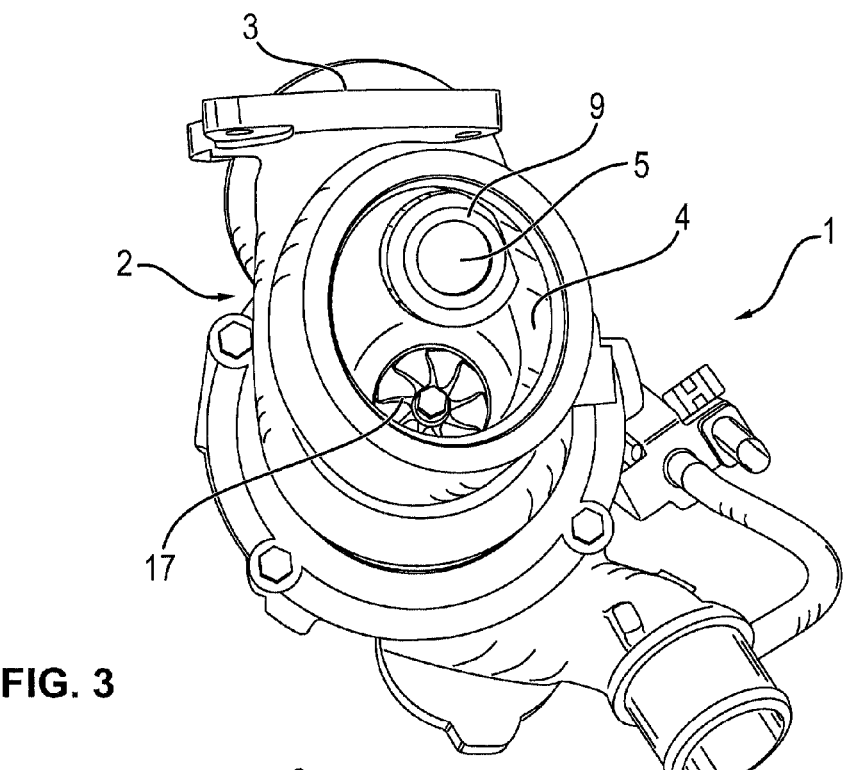
FIG. 3 shows a view of the turbocharger 1 from the direction of the turbine housing outlet.

FIG. 3 shows, further to FIG. 2, the closed position in which the piston 5 bears against the sealing ring 9.

Figure 4:
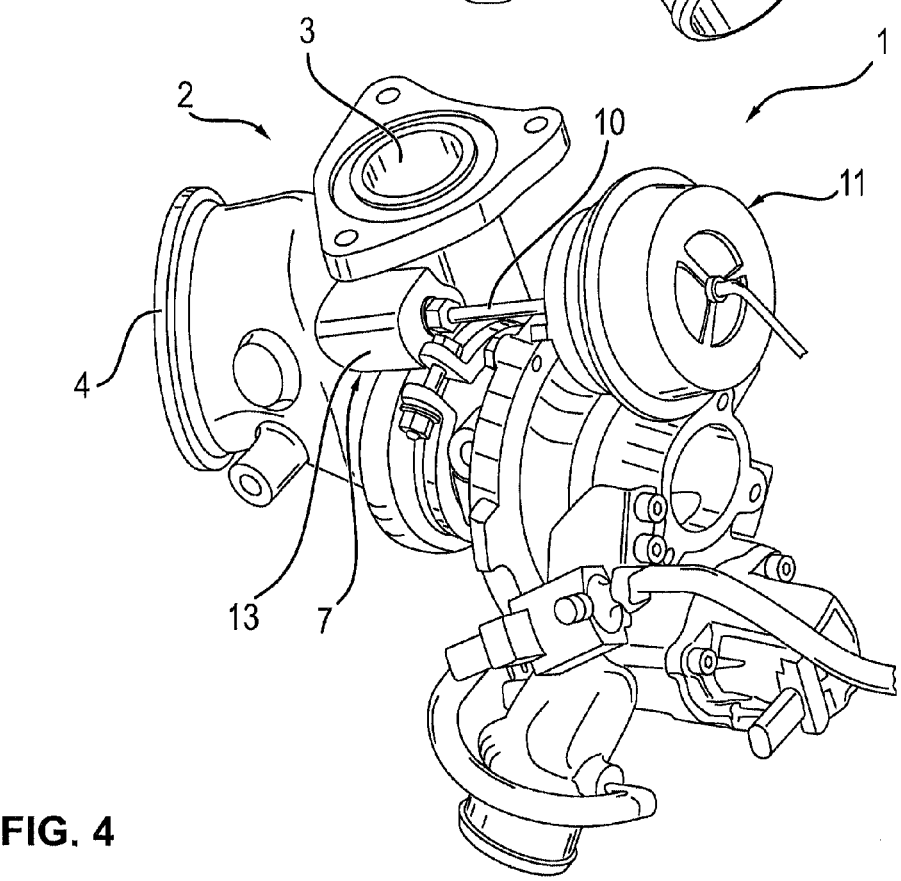
FIG. 4 shows a perspective illustration of the exhaust-gas turbocharger according to the invention as per FIGS. 1 to 3.

FIG. 4 shows that the guide 7 may be in the form of a cylindrical housing part 13 into which the piston rod 10 extends, preferably with the interposition of a piston ring 12 as illustrated in FIG. 1, and moves the piston 6 fastened to said piston rod. The cylindrical housing part 13 is fastened to or is an integral part of the turbine housing 2, such that the bypass duct 5 can open into the interior space 14.

In addition to the above written disclosure of the invention, reference is hereby made explicitly to the diagrammatic illustration thereof in FIGS. 1 to 4.

LIST OF REFERENCE SYMBOLS

1 Exhaust-gas turbocharger
2 Turbine housing
3 Turbine housing inlet
4 Turbine housing outlet
5 Wastegate/bypass duct
6 Shut-off element/piston
7 Guide
8 Outlet opening
9 Sealing ring
10 Piston rod
11 Actuator
12 Piston ring
13 Cylindrical housing part
14 Interior space
15 Compressor housing
16 Compressor wheel
17 Turbine wheel
18 Bearing housing
19 Shaft which bears the compressor wheel 16 and the turbine wheel 17 at its ends
L Longitudinal central line

The invention claimed is:

1. An exhaust-gas turbocharger (1) having
a turbine housing (2)
which has a turbine inlet (3) and a turbine outlet (4) and which has a wastegate duct (5) between the turbine housing inlet (3) and the turbine housing outlet (4), which wastegate duct can be opened and closed via a shut-off element (6),
wherein
the shut-off element is in the form of a piston (6) which is guided in a longitudinally displaceable manner in an interior space (14) of a guide (7),
the wastegate duct (5) opens into the interior space (14) transversely with respect to the longitudinal central line (L) of the guide (7), and
wherein the guide (7) has an outlet opening (8) into the turbine outlet (4), and wherein a sealing ring (9) is arranged in the outlet opening (8), wherein the piston (6), when it is in the closed position in which it shuts off the wastegate duct (5), bears against said sealing ring.

2. The exhaust-gas turbocharger as claimed in claim 1, wherein the sealing ring (9) is fixedly connected to the turbine housing (2).

3. The exhaust-gas turbocharger as claimed in claim 1, wherein the piston (6) is connected via a piston rod (10) to an actuator (11).

4. The exhaust-gas turbocharger as claimed in claim 3, wherein the piston rod (10) is sealed off with respect to the guide (7) via a piston ring (12).

5. The exhaust-gas turbocharger as claimed in claim 1, wherein the guide (7) is a cylindrical housing part (13), in the interior space (14) of which the piston (6) is guided and which is fixed to the turbine housing (2) or is an integral constituent part of the turbine housing (2).

6. The exhaust-gas turbocharger as claimed in claim 3, wherein the actuator (11) is a pneumatic control capsule or an electric actuating motor.

* * * * *